(12) United States Patent
Myers et al.

(10) Patent No.: US 6,973,825 B2
(45) Date of Patent: Dec. 13, 2005

(54) HOT-WIRE MASS FLOW SENSOR WITH LOW-LOSS BYPASS PASSAGE

(75) Inventors: Eric C. Myers, Howell, MI (US); Lawrence A. Zurek, Warren, MI (US); Richard W. Caron, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/373,165

(22) Filed: Feb. 24, 2003

(65) Prior Publication Data

US 2004/0163460 A1 Aug. 26, 2004

(51) Int. Cl.$^7$ .............................................. G01F 5/00
(52) U.S. Cl. ................................................. 73/202.5
(58) Field of Search .................... 73/202.5, 204.22, 73/204.25, 204.27, 118.2

(56) References Cited

U.S. PATENT DOCUMENTS

| | | | |
|---|---|---|---|
| 298,059 | A | 5/1884 | Bennett |
| 1,289,154 | A | 12/1918 | Miller |
| 2,550,186 | A | 4/1951 | Clamp |
| 2,801,133 | A | 7/1957 | Ridley |
| 3,844,586 | A | 10/1974 | Olen |
| 4,104,915 | A | 8/1978 | Husse |
| 4,387,914 | A | 6/1983 | Paulson et al. |
| 4,393,697 | A | 7/1983 | Sato et al. |
| 4,428,231 | A | 1/1984 | Peloza |
| 4,445,368 | A | 5/1984 | Sumal |
| 4,487,063 | A | 12/1984 | Hopper |
| 4,517,837 | A | 5/1985 | Oyama et al. |
| 4,619,562 | A | 10/1986 | Brännström |
| 4,669,052 | A | 5/1987 | Bianco |
| 4,709,581 | A | 12/1987 | Nishimura et al. |
| 4,733,357 | A | 3/1988 | Abe |
| 4,774,833 | A | 10/1988 | Weibler et al. |
| 4,777,820 | A | 10/1988 | Hecht et al. |
| 4,879,898 | A | 11/1989 | Bamer |
| 4,884,215 | A | 11/1989 | Zboralski et al. |
| 4,887,577 | A | 12/1989 | Arai et al. |
| 4,911,008 | A | 3/1990 | Casey |

(Continued)

FOREIGN PATENT DOCUMENTS

| | | |
|---|---|---|
| DE | 197 41 031 A1 | 3/1999 |
| EP | 0 082 107 A3 | 12/1982 |
| EP | 1 363 110 A1 | 11/2003 |

*Primary Examiner*—Edward Lefkowitz
*Assistant Examiner*—T Miller
(74) *Attorney, Agent, or Firm*—Brinks Hofer Gilson & Lione

(57) ABSTRACT

A mass fluid flow sensor includes an internal bypass passage characterized by a first section that converges along a first axis to define a nozzle, and a radially-expanded generally-cylindrical second section immediately adjacent to and coaxial with the first section so as to define a radial step at the nozzle exit. The passage further includes a semispherical third section adjacent to the second section having the same nominal diameter, a converging fourth section whose nominal axis is disposed at a right angle to the nominal axis of the first and second sections, and a fifth section adjacent to the fourth section that includes a further ninety degree bend. The resulting U-shaped passage features reduced pressure losses and an improved velocity profile, whereby the performance of a sensing element disposed in the passage proximate to the radial step is improved.

15 Claims, 2 Drawing Sheets

U.S. PATENT DOCUMENTS

| | | |
|---|---|---|
| 4,986,123 A | 1/1991 | Losing et al. |
| 4,991,424 A | 2/1991 | Lehto |
| 4,991,560 A | 2/1991 | Arai et al. |
| 4,995,645 A | 2/1991 | Pausch |
| 5,012,421 A | 4/1991 | Ishii |
| 5,036,701 A | 8/1991 | Van Der Graaf |
| 5,054,819 A | 10/1991 | Grunwald |
| 5,060,984 A | 10/1991 | Hess |
| 5,186,044 A | 2/1993 | Igarashi et al. |
| 5,216,918 A | 6/1993 | Landis et al. |
| 5,231,878 A | 8/1993 | Zanini-Fisher et al. |
| RE34,403 E | 10/1993 | Arai et al. |
| 5,270,935 A | 12/1993 | Dudek et al. |
| 5,279,154 A | 1/1994 | Vavra et al. |
| 5,293,553 A | 3/1994 | Dudek et al. |
| 5,307,677 A | 5/1994 | Beyrich et al. |
| 5,313,832 A | 5/1994 | Stephan et al. |
| 5,323,661 A | 6/1994 | Cheng |
| 5,327,940 A | 7/1994 | Presz, Jr. |
| 5,355,726 A | 10/1994 | Zurek et al. |
| 5,390,528 A | 2/1995 | Zurek et al. |
| 5,394,331 A | 2/1995 | Dudek et al. |
| 5,465,618 A | 11/1995 | Yasui et al. |
| 5,467,648 A | 11/1995 | Igarashi et al. |
| 5,504,681 A | 4/1996 | Sherman |
| 5,537,870 A | 7/1996 | Zurek et al. |
| 5,563,340 A | 10/1996 | Clowater et al. |
| 5,590,916 A | 1/1997 | Liu |
| 5,672,822 A | 9/1997 | Sawada et al. |
| 5,693,879 A | 12/1997 | Rilling et al. |
| 5,696,321 A | 12/1997 | Igarashi et al. |
| 5,705,745 A | 1/1998 | Treutler et al. |
| 5,712,425 A | 1/1998 | Hecht et al. |
| 5,744,713 A | 4/1998 | Wienand et al. |
| 5,756,893 A | 5/1998 | Kondo et al. |
| 5,804,718 A | 9/1998 | Nagasaka et al. |
| 5,894,088 A | 4/1999 | Sawada et al. |
| 5,942,683 A | 8/1999 | Aoi et al. |
| 5,948,975 A | 9/1999 | Mueller et al. |
| 5,983,809 A | 11/1999 | Vatsky |
| 6,012,432 A | 1/2000 | Igarashi et al. |
| 6,044,701 A | 4/2000 | Doyle et al. |
| 6,070,462 A | 6/2000 | Igarashi et al. |
| 6,079,265 A | 6/2000 | Wienand et al. |
| 6,148,663 A | 11/2000 | Stahl et al. |
| 6,170,327 B1 | 1/2001 | Wildgen |
| 6,179,342 B1 | 1/2001 | Shen |
| 6,182,639 B1 | 2/2001 | Igarashi et al. |
| 6,220,090 B1 | 4/2001 | Kohno et al. |
| 6,223,594 B1 | 5/2001 | Takiguchi et al. |
| 6,336,361 B1 | 1/2002 | Uramachi et al. |
| 6,622,555 B2 * | 9/2003 | Straight et al. ............ 73/202.5 |

* cited by examiner

HOT-WIRE MASS FLOW SENSOR WITH LOW-LOSS BYPASS PASSAGE

FIELD OF INVENTION

The invention relates to systems in which a bend is defined in a fluid-handling conduit or passage that otherwise extends between a first region of relatively-higher pressure to a second region of relatively-lower pressure, as may be found in the bypass passage of a thermal-type or "hot-wire" mass fluid flow sensor.

BACKGROUND OF THE INVENTION

The prior art teaches that the importance of measuring air intake into an internal combustion engine for purposes of improving engine control. One type of mass fluid flow sensor includes a housing that projects into the main air intake tube of the engine and defines a bypass passage into which a small sample of intake air is diverted, for example, by a converging inlet section of the passage that is placed in opposition with the primary direction of airflow in the tube. A hot-wire resistive element disposed within the passage is used to generate a signal representative of instantaneous mass fluid flow through the passage, from which a controller calculates instantaneous mass airflow into the engine, as taught in co-pending U.S. patent application Ser. No. 10/126,810 tiled Apr. 19, 2002, now published as U.S. patent application No. 2003/0196486A1, and assigned to the assignee of the invention, the disclosure of which is hereby incorporated by reference.

The sensor housing is preferably provided with an exterior surface contour that cooperates with the relative location of the outlet section of the passage to create a low pressure area which draws air out of the bypass passage. The resulting "push-pull" configuration enhances the flow of fluid through the passage to thereby increase the sensor's signal-to-noise ratio. By way of example, in U.S. Pat. No. 5,556,340, the exterior surface contour is a wedge-shaped air deflector on the housing's leading edge immediately upstream of the outlet section of the passage.

The prior art further recognizes the importance of limiting the effect of back flow through the bypass passage on the airflow measurement. Thus, for example, the '340 patent teaches use of a U-shaped bypass passage that positions the inlet and outlet sections of the bypass passage relatively close to one another in the primary direction of air flow, to thereby reduce back flow by creating a similar pressure at the inlet and outlet sections of the passage under reverse flow conditions.

Unfortunately, the conduit turns or bends inherent to the U-shaped design generate fluidic losses as the diverted flow impinges against the outer wall of each passage bend, as well as due to turbulent flow induced along the inner wall of each passage bend, which disrupts the velocity profile of the diverted flow as it passes the hot-wire element, notwithstanding the use of a "push-pull" passage configuration. These effects, in turn, limit the signal-to-noise ratio and dynamic range that may be achieved with such sensors.

SUMMARY OF THE INVENTION

Under the invention, a mass fluid flow sensor, for example, for measuring airflow in a primary direction through an air intake system of a motor vehicle, includes a housing adapted to be inserted into the airflow. The housing includes an internal passage having an inlet that is placed in opposition to the primary direction of airflow, and an outlet disposed at a predetermined angle with respect to the primary direction of airflow such that a minimum pressure drop is developed at the outlet relative to the inlet as fluid flow in the primary direction passes over the housing. A sensing element, such as a hot-wire element, is disposed within the passage to detect fluid flow through the passage.

In accordance with an aspect of the invention, the passage includes, in series, a first section converging along a first axis to define an annular nozzle having a nozzle diameter, and a generally-right-cylindrical second section adjacent to the first section and extending along the first axis, wherein the second section has a nominal diameter that is greater than the nozzle diameter, such that a radial step is defined immediately downstream of the nozzle. The sensing element is preferably disposed in the passage proximate to the nozzle exit.

The passage also includes a third section adjacent to the second section that defines a generally-semi-spherical chamber centered on the first axis in opposition to the radial step, with the chamber having an effective radius substantially equal to one half of the diameter of the second section. The passage further includes a fourth section adjacent to at least one of the second and third sections, with the fourth section converging along a second axis to a minimum diameter. The second axis is disposed at a first, nonzero angle with respect to the first axis and, in a preferred embodiment, is disposed at roughly a ninety degree angle with respect to the first axis.

In accordance with another aspect of the invention, the sensing element is preferably disposed in the passage proximate to the radial step, whereby the sensing element is exposed to a diverted flow that is accelerated by the first section for increased sensor dynamic range, and which is provided a more uniform velocity profile by virtue of passage's several sections.

In accordance with yet another aspect of the invention, the minimum diameter of the fourth section is not less than the diameter of the second section and, most preferably, is substantially equal to the diameter of the second section, such that the velocity profile of the airflow at the minimum diameter portion of the fourth passage section is roughly the same as the velocity profile of the airflow within the downstream portion of the second passage section.

In accordance with a further aspect of the invention, the passage also includes a substantially-constant-diameter fifth section immediately adjacent to the fourth section, in which the diameter of the fifth section is substantially equal to the minimum diameter of the fourth section. Preferably, the fifth section includes an arcuate bend characterized by a substantially-constant cross-sectional area through the bend, and the fifth section terminates along an outlet axis that is substantially parallel to the first axis of the first section, whereby the passage is provided a nominal "U-shaped" configuration and the passage outlet is placed in close proximity to the passage inlet.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
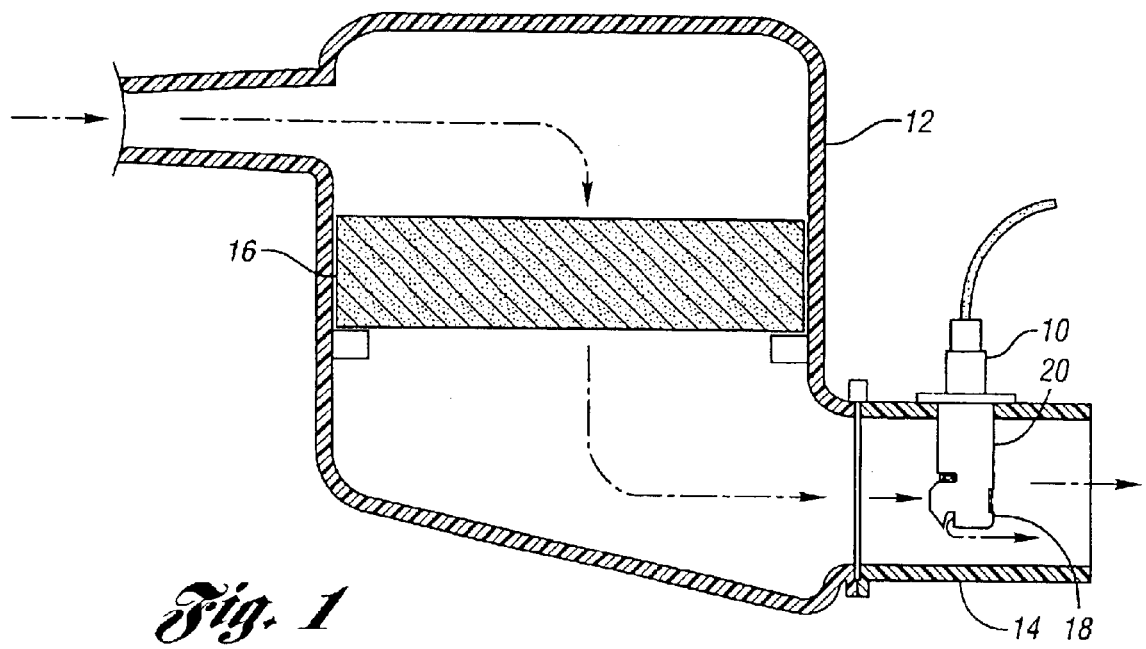
FIG. 1 is a sectional view of an air intake system for an internal combustion engine featuring an exemplary mass fluid flow sensor in accordance with the invention.
Figure 2:
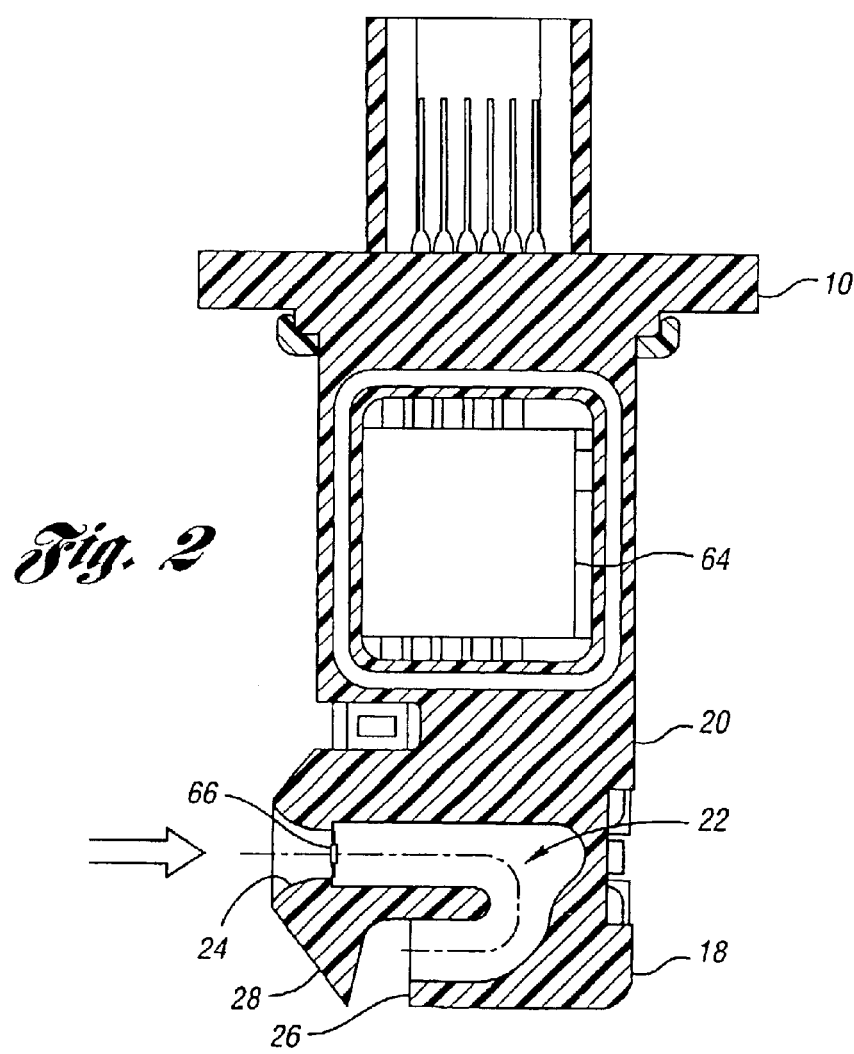
FIG. 2 is a sectional view of the exemplary mass fluid flow sensor of FIG. 1.
Figure 3:
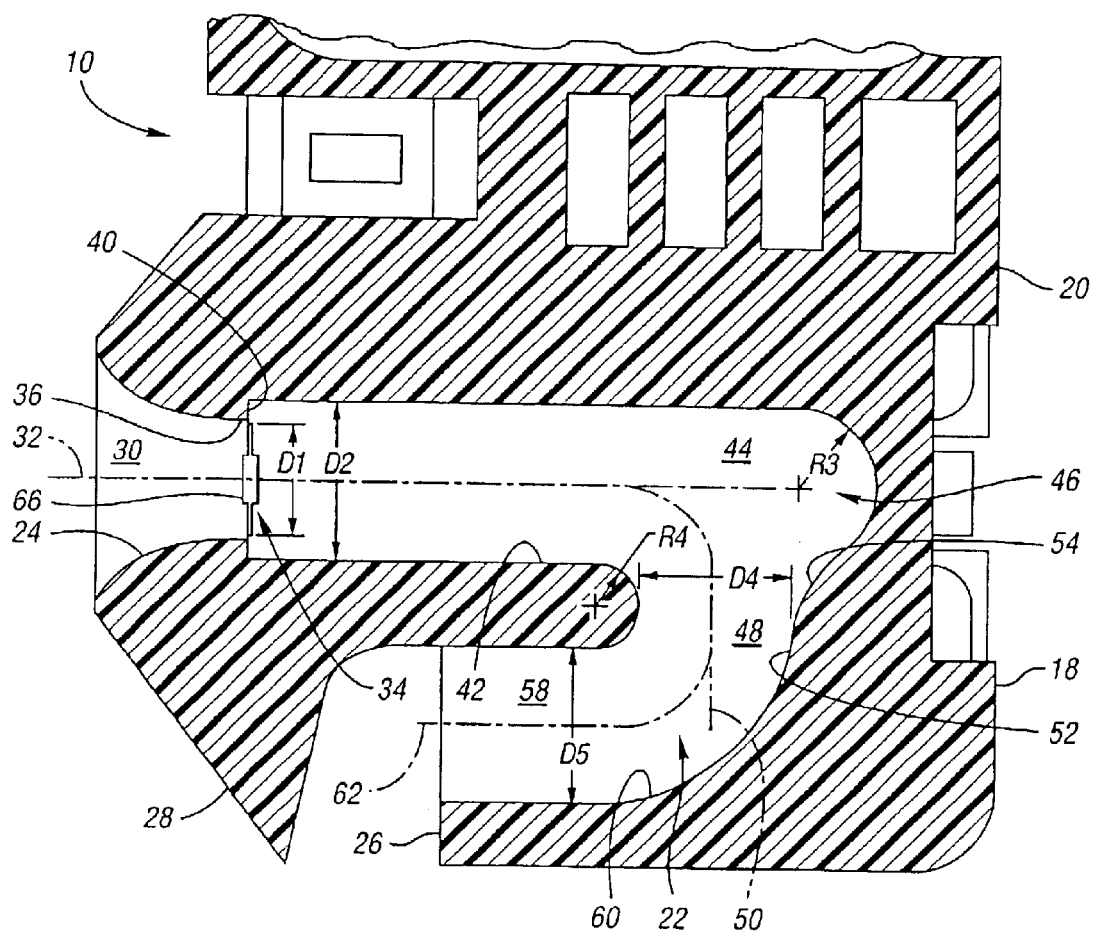
FIG. 3 is an enlarged partial section of the lower portion of the exemplary mass fluid flow sensor.

Referring to FIG. 1, an exemplary mass air flow sensor 10 in accordance with the invention is disposed within an air intake system 12 of an internal combustion engine. By way of example only, the sensor 10 is disposed within an air duct 14 positioned downstream of a filter element 16, such that the lower portion 18 of the sensor's housing 20 projects into the main stream of air flowing through the duct 14. As seen in FIGS. 2 and 3, a U-shaped fluid-sampling bypass passage 22 is defined in the lower portion 18 of the sensor housing 20, such that an inlet 24 to the passage 22 is placed in opposition to the primary direction of airflow through the duct 14 during engine operation. An outlet 26 of the passage 22, defined on the housing 20 in proximity with the passage inlet 24, is disposed at an angle with respect to the primary airflow direction. Preferably, as seen in FIG. 2, the passage outlet 26 is located immediately downstream of a suitable exterior housing contour or feature, such as a wedge deflector 28, that advantageously causes a region of relatively-lower pressure to form adjacent to the passage outlet 26 when the air flows through the duct 14 in the primary direction. The pressure differential thus achieved between the passage inlet 24 and the passage outlet 26 advantageously enhances the flow of diverted air through the passage 22.

As best seen in FIG. 3, the passage 22 includes five discrete, adjoining sections. The elliptically-converging first passage section 30, proximate to the passage inlet 24, defines a jet nozzle extending along a first axis 32 to thereby provide a critical area 34, proximate to the nozzle exit 36, that is characterized by a substantially uniform fluid flow velocity across the critical area 34. It will be appreciated that the converging first section further advantageously operates to "condition" the diverted airflow to reduce the turbulence within the passage 22.

The second section 38 of the passage 22, immediately adjacent to the first section 30, is a radially-expanded section of generally-right-cylindrical configuration that is coaxial with the first axis 32. The nominal diameter D2 of the expanded second section 38 is significantly greater than the minimum diameter D1 of the first passage section 30 (at the nozzle exit 36). As seen in FIG. 3, the resulting radial step 40, defined at the juncture of the first and second passage sections 30, 38, generates annular vortices as the diverted airflow exits the nozzle to thereby create a "fluid bearing" which extends circumferentially around the nozzle exit 36 and enhances fluid flow through the passage 22. Significantly, the axial length of the second passage section 38 is selected such that, at a maximum flow velocity, the diverted airflow contacts or "attaches" to the walls within the downstream portion 42 of the second section 38.

The third section 44 of the passage 22, immediately adjacent to the downstream portion 42 of the second section 38, defines a generally-semi-spherical chamber 46 centered on the first axis 32 in opposition to the radial step 40, with the third chamber 46 having an effective radius R3 substantially equal to one half of the diameter D2 of the second section 38.

Figure 4:
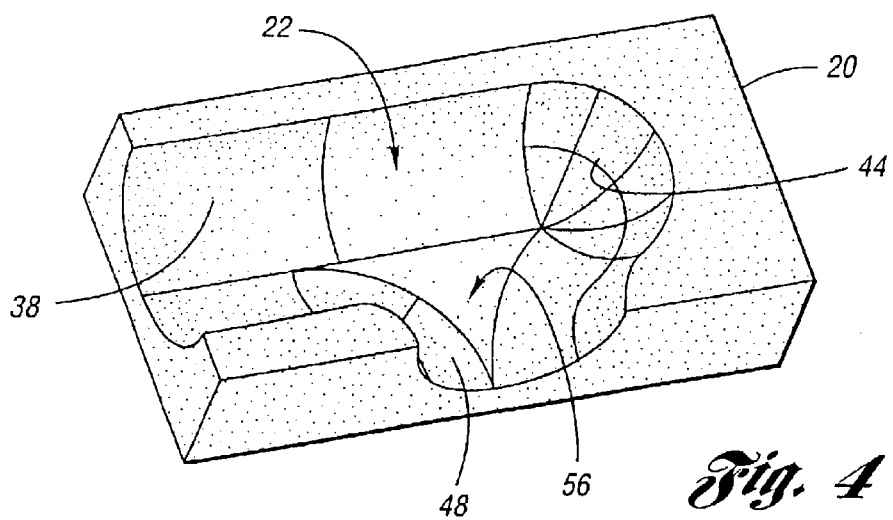
FIG. 4 is an enlarged, partial isometric view of the second, third, and fourth sections of the housing's internal bypass passage.

The fourth section 48 of the passage 22, adjacent to at least one of the second and third sections 38, 44, converges along a second axis 50 to a minimum diameter D4 that is substantially equal to the diameter D2 of the second section 38, such that the velocity profile of the airflow at the minimum diameter portion 52 of the fourth passage section 48 is roughly the same as the velocity profile of the airflow within the downstream portion 42 of the second passage section 38. While the invention contemplates that the second axis 50 may be disposed at a range of nonzero angles with respect to the first axis 32, as seen in FIG. 3, in the exemplary sensor 10, the second axis 50 is disposed at roughly a ninety degree angle with respect to the first axis 32. And, while the minimum radius of curvature defining the mouth portion 54 of the fourth section 48 may be any suitable value, in the exemplary sensor 10, the mouth portion 54 features a substantially constant radius of curvature R4 is large enough to prevent vortex formation in the passage 22 downstream of the section's minimum diameter portion 52. As best seen in FIG. 4, the intersection of the second, third, and fourth sections of the passage 22 defines a pair of opposed, roughly-triangular flats 56 within the passage 22.

Lastly, the passage 22 includes a substantially-constant-diameter fifth section 58 immediately adjacent to the fourth section 48, whose diameter D5 is substantially equal to the minimum diameter D4 of the fourth section 48. As seen in FIGS. 2 and 3, the fifth section 58 advantageously includes an arcuate bend 60 characterized by a substantially-constant cross-sectional area through the bend 60. The fifth section 58 terminates along an outlet axis 62 that is substantially parallel to the first axis 32 of the first passage section 30, whereby the passage 22 is provided a nominal "U-shaped" configuration, with the passage outlet 26 in close proximity to the passage inlet 24.

Referring again to FIGS. 2 and 3, the exemplary sensor 10 further includes a plurality of resistive elements supported by the housing 20 and in electrical communication with a circuit module 64 disposed in the upper portion of the housing 20. The resistive elements include a hot-wire element 66 disposed within the passage's critical area 34 proximate to the nozzle exit 36 and the passage's radial step 40, whereby the hot-wire element 66 is exposed to the diverted airflow that has been accelerated by the first section 30 for increased sensor dynamic range, and that has a more uniform velocity profile in accordance with the invention. The location of the hot-wire element 66 within the critical area 34 insures that fluid having a uniform velocity profile flows over the hot-wire element 66 causing improved heat dissipation from the element 66, thereby providing enhanced fluid flow detection. Other resistive elements (not shown) include a cold wire element and an internal fluid temperature (IAT) element, the latter preferably being located on the housing 20 at a point external to the passage 22 to thereby minimize the fluid heating effects caused by heat dissipation from the hot-wire element 66. Generally, the resistive elements change resistance as a function of temperature, and the circuit module 64 senses airflow through the passage 22 by monitoring the power dissipated by the resistive elements.

In operation, as air is drawn into the air intake system 12 by the engine, a portion of the air is diverted into the sensor's bypass passage 22 by the converging first section 30 of the passage 22. The first passage section serves to accelerate the diverted airflow through the nozzle while reducing local turbulence and "conditioning" the airflow for a streamline approach to the hot wire element 66, thereby improving measurement sensitivity, stability, and accuracy. As the diverted airflow exits the nozzle, the airflow expands into the radially-larger, coaxial, second passage section 38. Turbulence generated at the radial step 40 defined between the first and second passage sections 30, 38 acts in the manner of a diffuser section to thereby provide an improved velocity profile, both in the critical area 34 proximate to the nozzle exit 36 and in the downstream portion 42 of the second section 38. The semispherical third section 44 and converging fourth section 48 cooperate to reduce pressure losses as the diverted airflow is redirected through the fifth passage section 58 to the passage outlet 26 with a substantially uniform velocity profile. And the relative proximity of the passage's inlet and outlet 24, 26 helps to reduce back flow through the passage 22 by creating similar air pressures at both the inlet 24 and the outlet 26.

While the above description constitutes the preferred embodiment, it will be appreciated that the invention is susceptible to modification, variation and change without departing from the proper scope and fair meaning of the subjoined claims. For example, while the exemplary sensor 10 is described in connection with the measuring the amount of air inducted into an internal combustion engine, the invention may be used in connection with the measurement of air flow through other conduits, and of other fluid flows generally, as well as for the design of low-loss ducts and passages. Further, as employed in the context of the airflow sensor illustrated in the Drawings, the fifth section of the illustrated airflow sensor passage features a gradual, constant diameter bend 60 so as to provide a nominal outlet axis 62 that is parallel to the nominal inlet axis 32 of the passage 22; however, it will be appreciated that the invention contemplates other relative outlet axis angles that are other than ninety degrees off the second axis 50, or that lie in a different plane from the inlet axis 32.

We claim:

1. A mass fluid flow sensor comprising:
    a housing adapted to be inserted in a fluid flow, the housing including an internal passage having an inlet in opposition to a primary direction of fluid flow and an outlet disposed at a predetermined angle with respect to the primary direction such that a minimum pressure drop is developed at the outlet relative to the inlet as fluid flow in the primary direction passes over the housing, wherein the passage includes, in series,
    a first section converging along a first axis to define an annular nozzle having a nozzle diameter,
    a generally-right-cylindrical second section adjacent to the first section and extending along the first axis, the second section having a diameter greater than the nozzle diameter and defining a radial step immediately downstream of the nozzle,
    a third section adjacent to the second section and defining a generally-semi-spherical chamber centered on the first axis in opposition to the radial step, the third section having an effective radius substantially equal to one half of the diameter of the second section, and
    a fourth section adjacent to at least one of the second and third intermediate sections, the fourth section converging along a second axis to a minimum diameter, the second axis being disposed at a first, nonzero angle with respect to the first axis; and
    a sensing element supported by the housing within the passage proximate to the radial step.

2. The sensor of claim 1, wherein the minimum diameter of the fourth section is not less than the diameter of the second section.

3. The sensor of claim 2, wherein the minimum diameter of the fourth section is substantially equal to the diameter of the second section.

4. The sensor of claim 3, wherein the passage further includes a substantially-constant-diameter fifth section immediately adjacent to the fourth section, wherein the diameter of the fifth section is substantially equal to the minimum diameter of th fourth section.

5. The sensor of claim 4, wherein the fifth section includes an arcuate bend characterized by a substantially-constant cross-sectional area through the bond.

6. The sensor of claim 5, wherein the fifth section terminates along an outlet axis that is substantially parallel to the first axis of the first section.

7. The sensor of claim 5, wherein the bend of the fifth section lies in a common plane with the first axis.

8. The sensor of claim 1, wherein the juncture of the second, third and fourth sections of the passage includes an opposed pair of substantially flat passage surfaces.

9. A fluid conduit defining an internal passage extending from a first region of relatively-higher pressure to a second region of relatively-lower pressure, wherein the passage redirects flow along a first axis to a second axis disposed at a nonzero angle with respect to the first axis, and wherein the passage is characterized by a plurality of adjoining sections including
    a first section converging along the first axis to define an annular nozzle having a nozzle diameter,
    a generally-right-cylindrical second section adjacent to the first section and extending along the first axis, the second section having a diameter greater than the nozzle diameter and defining a radial step immediately downstream of the nozzle,
    a third section adjacent to the second section and defining a generally-semi spherical chamber centered on the first axis in opposition to the radial step, the third section having an effective radius substantially equal to one half of the diameter of the second section, and
    a fourth section adjacent to at least one of the second and third sections, the fourth section converging along the second axis to a minimum diameter, a juncture between the fourth section and the at least one of the second and third sections defining a pair of opposed flats within the passage.

10. The conduit of claim 9, wherein the minimum diameter of the fourth section is not less than the diameter of the second section.

11. The conduit of claim 9, wherein the minimum diameter of the fourth section is substantially equal to the diameter of the second section.

12. The conduit of claim 9 wherein the passage further includes a substantially-constant-diameter fifth section immediately adjacent to the fourth section, wherein tile diameter of the fifth section is substantially equal to the minimum diameter of the fourth section.

13. The conduit of claim 12, wherein the fifth section includes an arcuate bend characterized by a substantially-constant cross-sectional area through the bend.

14. The conduit of claim 13, wherein the fifth section terminates along an outlet axis that is substantially parallel to the first axis of the first section.

15. The conduit of claim 12, wherein the bend of the fifth section lies in a common plane with the first axis of the first section.

* * * * *

UNITED STATES PATENT AND TRADEMARK OFFICE
CERTIFICATE OF CORRECTION

PATENT NO. : 6,973,825 B2  
DATED : December 13, 2005  
INVENTOR(S) : Eric C. Myers et al.

It is certified that error appears in the above-identified patent and that said Letters Patent is hereby corrected as shown below:

<u>Column 6,</u>
Line 3, after "area through the" delete "bond." and substitute -- bend. --.

Signed and Sealed this

Thirteenth Day of June, 2006

JON W. DUDAS  
*Director of the United States Patent and Trademark Office*